United States Patent [19]
Petrzelka et al.

[11] Patent Number: 5,222,915
[45] Date of Patent: * Jun. 29, 1993

[54] SELF-DESTRUCTING COUPLING ASSEMBLY FOR USE IN PROPELLER SHAFTS OF MOTOR VEHICLES

[75] Inventors: Miloslav Petrzelka, Much-Kranüchel; Werner Hoffmann, Siegburg, both of Fed. Rep. of Germany

[73] Assignee: GKN Automotive AG, Siegburg, Fed. Rep. of Germany

[*] Notice: The portion of the term of this patent subsequent to Jun. 2, 2009 has been disclaimed.

[21] Appl. No.: 543,148

[22] Filed: Jun. 25, 1990

[30] Foreign Application Priority Data

Jun. 24, 1989 [DE] Fed. Rep. of Germany ....... 3920793

[51] Int. Cl.$^5$ ............................. F16C 3/00; F16D 9/00
[52] U.S. Cl. ..................................... 464/181; 464/182
[58] Field of Search .................. 464/181, 182, 183, 30, 464/32; 403/2, 282, 359; 280/446.1, 449, 451; 301/24 R

[56] References Cited

U.S. PATENT DOCUMENTS

| | | | |
|---|---|---|---|
| 3,367,142 | 2/1968 | Groves et al. ................... | 464/181 X |
| 3,779,591 | 12/1973 | Rands ............................. | 188/376 X |
| 4,052,826 | 10/1977 | Chisholm ........................ | 403/2 X |
| 4,238,539 | 12/1980 | Yates et al. ..................... | 464/181 |
| 4,238,540 | 12/1980 | Yates et al. ..................... | 464/183 X |
| 4,379,707 | 4/1983 | Fisher et al. .................... | 403/359 X |
| 4,380,443 | 4/1983 | Federmann et al. ............. | 464/181 |
| 4,421,497 | 12/1983 | Federmann et al. ............. | 464/183 X |
| 4,722,717 | 2/1988 | Salzman et al. ................. | 464/181 |
| 4,807,351 | 2/1989 | Berg et al. ...................... | 403/359 X |
| 4,932,924 | 6/1990 | Löbel .............................. | 464/181 |
| 4,952,195 | 8/1990 | Traylor ........................... | 464/181 |
| 5,118,214 | 6/1992 | Petrzelka et al. ............... | 188/376 X |

FOREIGN PATENT DOCUMENTS

3007896 9/1981 Fed. Rep. of Germany.
3828018 3/1989 Fed. Rep. of Germany.

Primary Examiner—Daniel P. Stodola
Attorney, Agent, or Firm—Anderson Kill Olick & Oshinsky

[57] ABSTRACT

A connecting assembly for use in the propeller shaft in the driveline of a motor vehicle between the end of a tubular shaft preferably made of a fiber composite material, and a connecting piece positioned coaxially relative to the shaft end. The shaft and connecting piece have connecting members which inter-fit in the circumferential direction. The tubular shaft is designed to sustain without damage greater impacting force in the longitudinal axial direction than is required to displace the connecting piece relative to the shaft in said direction. In the longitudinal direction, the shaft is provided with a variable wall thickness and the connecting piece is provided with an expanding cone for destroying the shaft in the event that the connecting piece slides relative to the shaft.

13 Claims, 5 Drawing Sheets

SELF-DESTRUCTING COUPLING ASSEMBLY FOR USE IN PROPELLER SHAFTS OF MOTOR VEHICLES

BACKGROUND OF THE INVENTION

1. Field of the Invention

The invention relates to a connecting assembly suitable for use in a propeller shaft of the driveline of a motor vehicle. The assembly comprising a tubular shaft, preferably made of a composite material, and a connecting piece positioned coaxially relative to an end of the tubular shaft, the shaft and the connecting piece having connecting means which inter-fit with one another in the circumferential direction so that drive can be transmitted.

2. Description of Prior Art

From West German Patent Specification No. 30 07 896, there is known a connecting assembly of the said type in which the end of the tubular shaft is slid on to the connecting piece which is provided with outer teeth, with the teeth cutting into the tube surface. The outside of the connection is secured by an annular member safeguarding the assembly.

From West German Patent Specification No. 38 28 018, there is known a connecting assembly in which, again, a metallic connecting piece with outer teeth is pressed into the end of a fiber composite tubular shaft with the teeth cutting into the composite material and with the end of the shaft radially expanded. In the region adjacent the pressed-in connecting piece (which at the same time serves as a joint part) the cross-section of the fiber composite tube is reduced.

Furthermore, from U.S. Pat. No. 4 722 717, there is known a connecting assembly between the open end of a fiber composite tubular shaft and a connecting piece in which complementary longitudinal and circumferential grooves are provided on the inner face of the shaft end and on the outer face of the inserted connecting piece, which grooves are filled with a hardenable resin which may contain short fiber parts so that after hardening of the resin a connecting member providing a form-fitting connection in the circumferential and axial directions is formed.

In the latter case, it is the intention to provide a connection between the end of the shaft and the connecting piece which may not only be torque-loaded but which is also axially firm. Because of their specific designs, the first two above-mentioned assemblies may also be subjected to high loads, or at least compressive forces, both in the circumferential and axial directions.

The deformation behavior in the case of a frontal impact of a modern motor vehicle is specified from the point of view of design in such a way that certain progressive characteristic deformation curves are achieved.

When using the above-mentioned connecting assemblies in longitudinal driveshafts (propeller shafts) of motor vehicles with rear wheel drive or four wheel drive it has been found to be highly disadvantageous that fiber composite shafts or other lightweight shafts which, as a rule, may do without an intermediate joint because of their low weight, are characterized by a very high degree of stiffness. The energy absorption conditions of the vehicle as specified are upset by the connection between the rear axle masses and the vehicle front through the propeller shaft.

SUMMARY OF THE INVENTION

It is the object of the present invention to provide a connecting assembly incorporating a shaft which is suitable for positively influencing the energy absorption requirements of the vehicle in the case of a frontal collision.

The invention provides a connecting assembly suitable for use in a propeller shaft of the driveline of a motor vehicle, the assembly comprising a tubular shaft and a connecting piece positioned coaxially relative to an end of the tubular shaft, the shaft and the connecting piece having connecting means which inter-fit with one another in the circumferential direction to enable drive transmission, wherein the tubular shaft is designed to sustain without damage greater impacting force in the longitudinal direction than is required to displace the connecting piece relative to the shaft in said direction and wherein, for the purpose of ensuring axially variable energy absorption, the tubular shaft, in the longitudinal direction, is provided with a variable wall thickness and on the connecting piece there is provided means for destroying the tubular shaft when the piece slides relative to the tubular shaft.

In this way, it is possible to provide a simple design which ensures problem-free transmission of the necessary torque values, which, under standard operating conditions, is also capable of accommodating a limited amount of longitudinal forces in order, for example, to ensure the effect of conventional sliding joints following the shaft but which, in the case of frontal impacts or collisions, permits disconnection of the rear axle masses from the vehicle front by displacement of the connecting piece relative to the tubular shaft against the sticking forces which hold the connecting piece and tubular shaft together. After separation of the connection by suitable means, the shaft end is destroyed directly at the connecting assembly so that even during the subsequent process of vehicle deformation, the shaft stiffness will not have an adverse effect. For example, adjacent to the end of the tubular shaft, the connecting piece may be provided with a tearing cone for tearing the shaft if the shaft end is slid on to the connecting piece. The connecting piece may alternatively, surround the end of the tubular shaft externally and be provided, adjacent to the end of the tubular shaft, with a squeezing cone for destroying the shaft. Alternatively, adjacent the end of the tubular shaft, the connecting piece may be provided with at least one cutting wedge for cutting through the shaft. Preferably, several circumferentially distributed cutting wedges are provided which slit open the shaft in the longitudinal direction.

It is also possible to provide a simple step arranged at an axial distance from the shaft end. It is important in this case that, for tearing off purposes, there are no substantial cross-sectional changes in the connecting piece adjacent the shaft end.

Accordingly, the interfering influences affecting the crush zone and air bag initiation caused by the stiffness of the tubular shaft are eliminated. Furthermore, the variation in the wall thickness of the shaft enables the energy absorption characteristics of the shaft in the longitudinal direction to be adjusted as required.

The shaft is preferably made of fiber composite material and the variable wall thickness, in this case, may be provided by additional circumferential windings.

Preferably, the sticking forces between the end of the tubular shaft and the connecting piece which are effective in the longitudinal direction are greater than the axial deceleration forces occurring in the tubular shaft in the axial direction as the result of a low-speed non-destructive frontal impact of the vehicle, such low speeds being in the area of "pedestrian protection" and "protection at low speeds", i.e. the so-called 3 mph impact of the vehicle should not lead to any changes in the connecting assembly.

The wall thickness of the tubular shaft may decrease or, alternatively, increase in steps.

The inter-fitting connecting means may be provided by an outer surface of the connecting piece which is polygonal in transverse cross-section or is provided with longitudinal teeth and by a complementary surface of a connecting member which is secured to an end portion of the tubular shaft. The connecting member may be a sleeve adhesively-secured to an end portion of the tubular shaft. The connecting member may be produced from a fiber composite material or suitable plastics or resin material which is adhesively-secured into the shaft end which is then slid on to the connecting piece. Alternatively, the connecting member may be formed in situ between the connecting piece and an end portion of the shaft between two collar regions. In this case, the connecting piece or tubular shaft are provided with supply and ventilation apertures to allow for introduction of a resin, especially a resin mixed with short fibers.

To avoid any sticking forces between the toothed or polygonal connecting piece and the connecting member it may be sufficient to select and pair the right types of material, but as a rule separating means will have to be applied to the connecting piece. If this is not sufficient, the connection between the connecting piece and connecting member, prior to final assembly, may initially be torn off axially and then the two parts may be inserted into each other again while being adequately fixed for the purpose of receiving low forces.

The connecting member may advantageously have at least one opening therein so that at least in one circumferential region a direct adhesive-connection can be formed between the connecting piece and the tubular shaft.

The force curves of the tubular shaft may be calculated to be opposite relative to those of the vehicle front, i.e. the force curves may decrease for increasing force curves in the vehicle front or vice versa.

BRIEF DESCRIPTION OF DRAWINGS

Preferred embodiments of the present invention are illustrated in the drawings in which.

DESCRIPTION OF PREFERRED EMBODIMENTS

Figure 1:
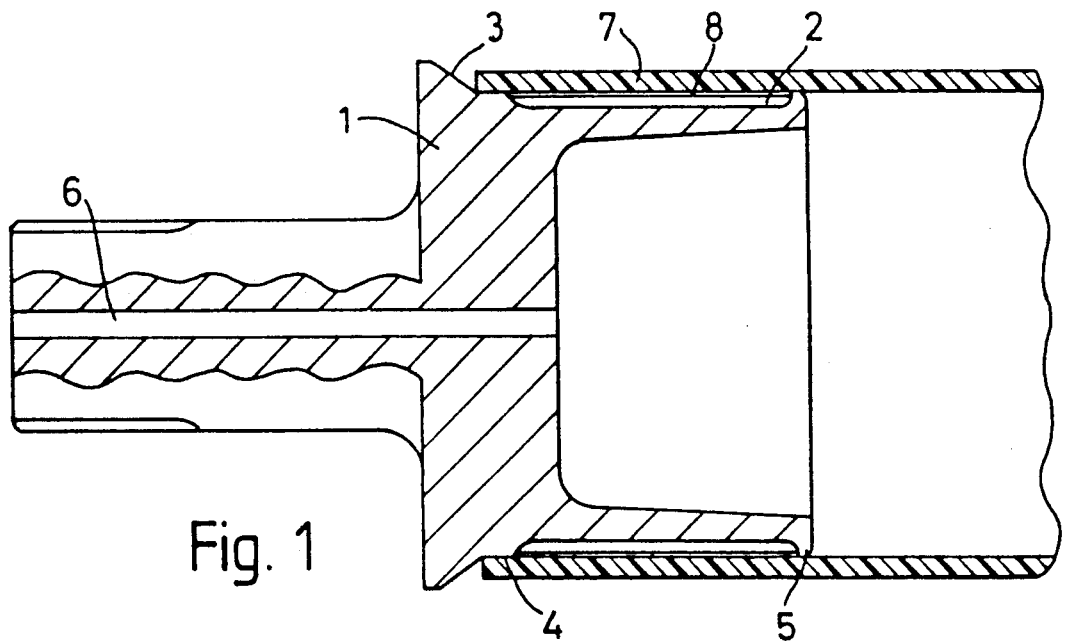
FIG. 1 is a longitudinal section through a connecting assembly having an expanding cone on the connecting piece, the assembly including a tubular shaft of constant wall thickness.
Figure 2:
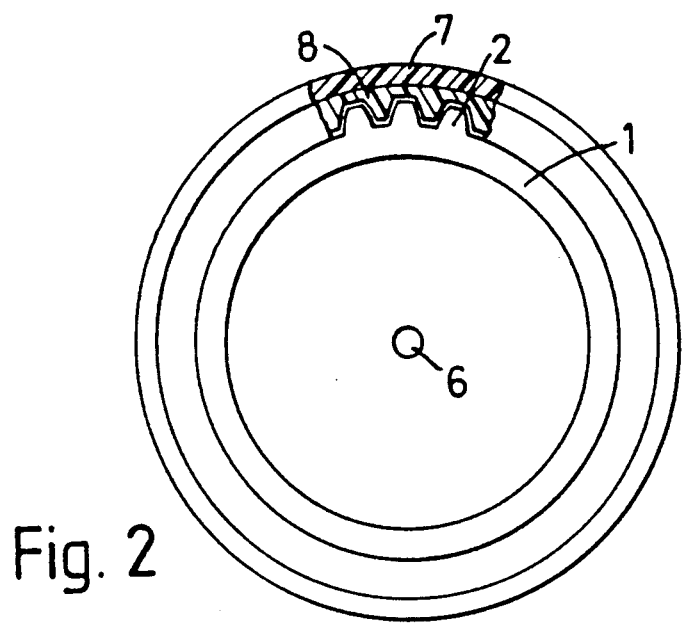
FIGS. 2 and 2A are respectively a cross-section through the connecting assembly according to FIG. 1 and an enlarged detail of FIG. 2.
Figure 3:
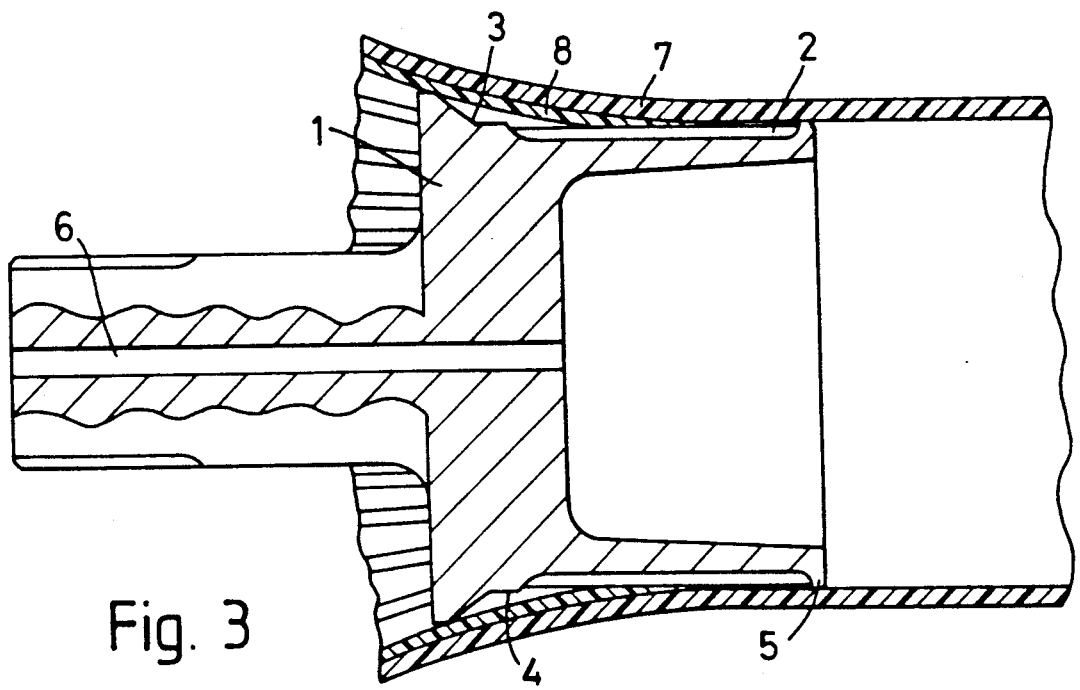
FIG. 3 shows the connecting assembly according to FIGS. 1 and 2 in a partially destroyed condition.
Figure 4:
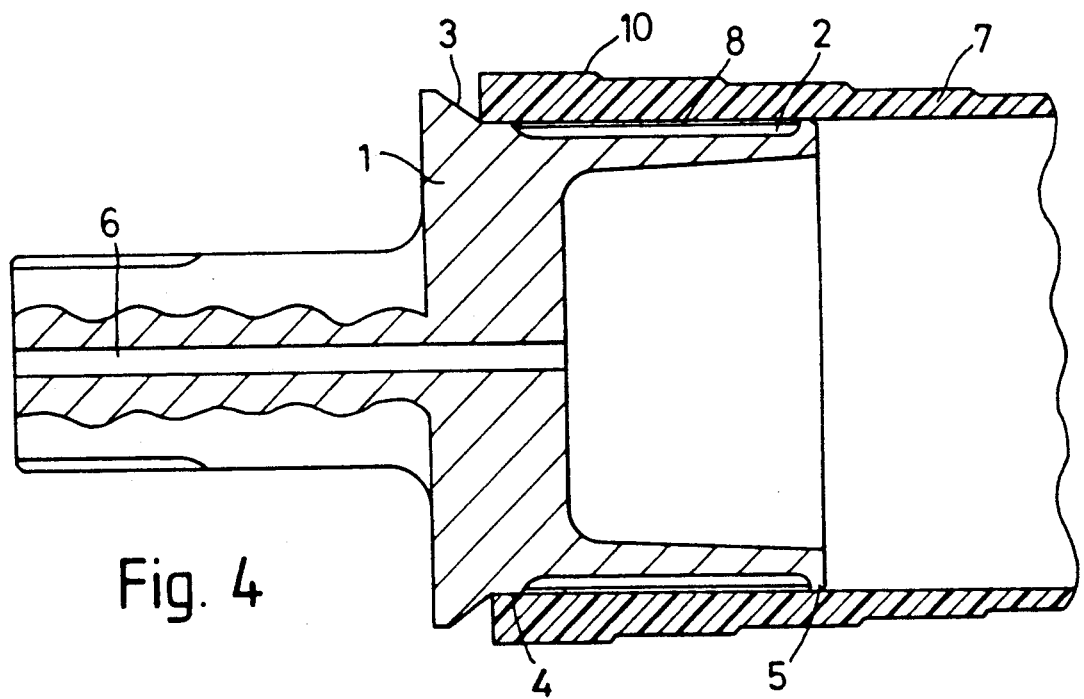
FIG. 4 shows a connecting assembly with an expanding cone at the connecting piece, and a shaft end with an increasing wall thickness.
Figure 5:
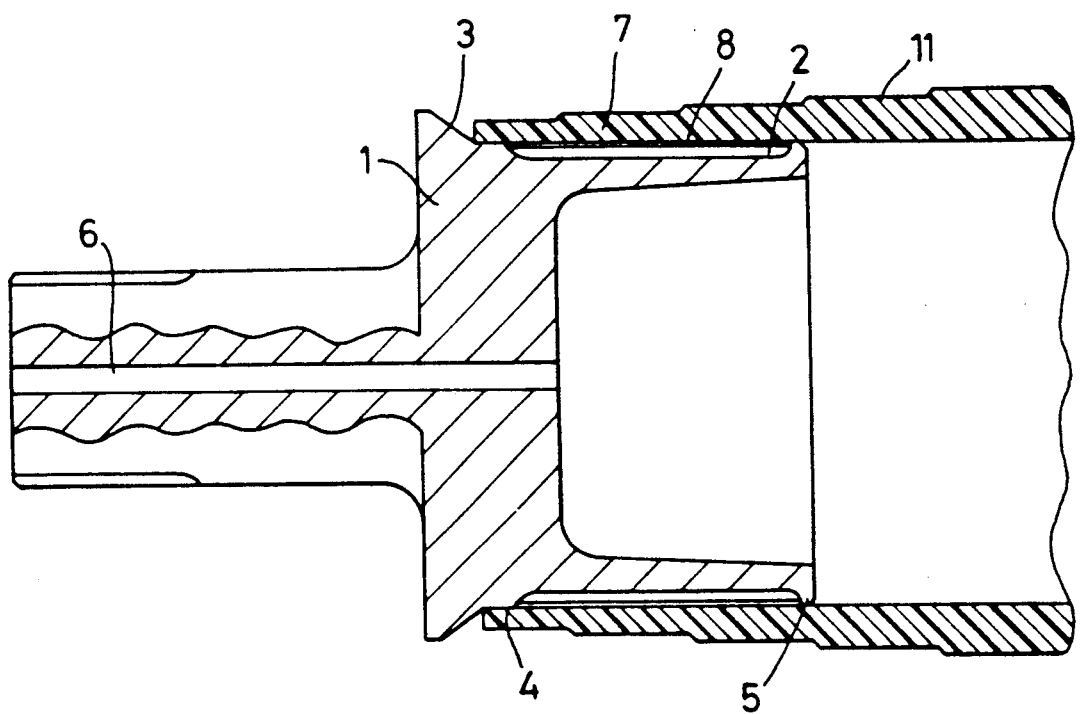
FIG. 5 shows a connecting assembly with an expanding cone at the connecting piece, and a shaft end with a decreasing wall thickness.

FIG. 1 shows a connecting assembly suitable for use as a part of a propeller shaft of the drive line of a motor vehicle. The propeller shaft comprises a shaft 7 made of a fiber composite material and a connecting piece 1 on to which the shaft 7 is slid. The shaft 7 of FIGS. 1 to 3 is illustrated for the purposes of the description as having a constant wall-thickness but in practice has a variable wall thickness which can vary in any desired manner, for example as shown in FIGS. 4 and 5. The wall thickness variation can be provided by additional circumferential windings on the shaft 7. The connecting piece 1 is hence positioned coaxially relatively to an end of the shaft 7. The shaft 7 and the piece 1 have connecting means including a connecting member 8 which inter-fit with one another in the circumferential direction to allow drive transmission. The shaft end comprises two collar regions 4, 5 as centering means of the piece 1. Between these two collar regions, the connecting piece 1 comprises outer teeth 2. The connecting member 8 form-fittingly engages said teeth and has established an adhesive connection with the cylindrical inner face of the shaft end 7. In the region adjacent to the shaft end, the connecting piece 1 comprises an expanding cone 3. The connecting piece 1 further comprises a central ventilation bore 6 extending coaxially therethrough.

Figure 1A:
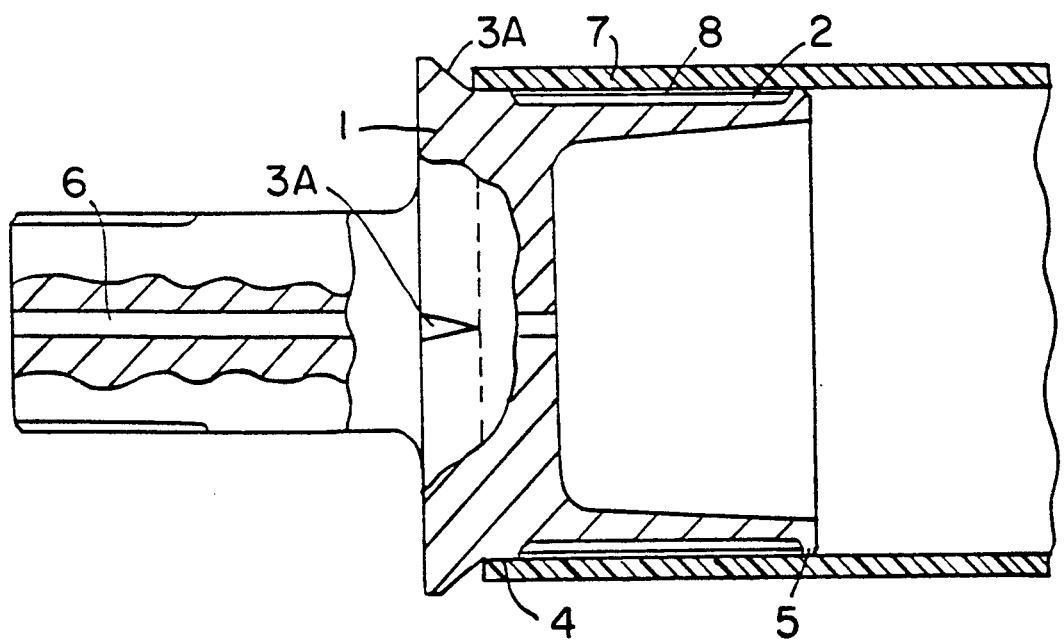
FIG. 1A is a longitudinal section through a connecting assembly having a number of cutting wedges on the connecting piece, the assembly including a tubular shaft of constant wall thickness.

FIG. 1A shows a connecting assembly similar to that shown in FIG. 1, with the exception that the expanding cone shown in FIG. 1 is replaced by a series of circumferetially spaced cutting wedges 3A. Similar parts in FIGS. 1 and 1A have the same reference numerals.

FIG. 2 shows the connecting piece end provided with said teeth 2 and the internally cylindrical shaft end 7 between which there can be identified a connecting member 8 which is produced from hardened resin, especially fiber-reinforced resin, which has established an adhesive fitting connection with the shaft and which is separated from the teeth 2 by separating means in a layer 9 in such a way that only a form-fitting connection is produced.

Figure 2A:
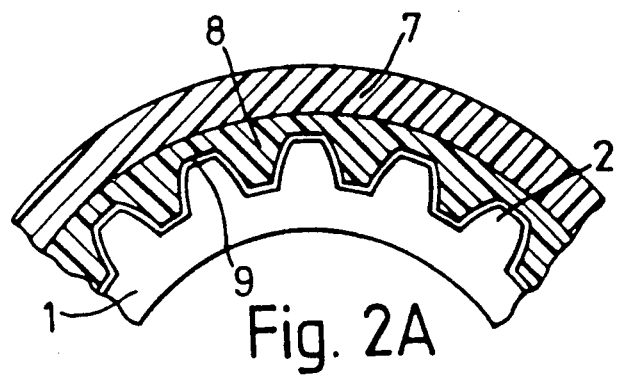
Figure 2B:
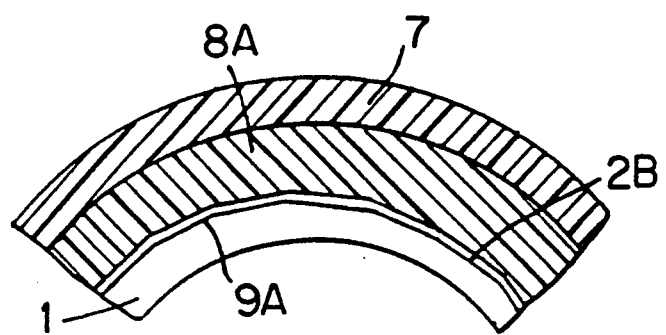
FIG. 2B is a cross-section through a connecting assembly similar to FIG. 2A but showing a connecting piece having a pair of polygonal cross-section.

FIG. 2B shows the connecting piece having an end part 2B with a polygonal cross-section. A connecting member 8A is adhesively secured to the shaft 7 and separated from the part 2B by a separating layer 9A in a manner similar to that described in connection with FIG. 2A.

FIG. 3 shows the connecting assembly according to FIGS. 1 and 2 in the process of being destroyed. The shaft end 7 and the adhering connecting member 8 are permanently expanded by the expanding cone 3 and lifted off the teeth 2 between the collars 4, 5 without losing the closed tubular shape.

In the description of the connecting assembly of FIG. 1A, the cutting wedges 3A destroy the end of the shaft 7 as the connecting piece is forced into the shaft.

The tubular shaft 7 is designed to sustain without damage greater impacting force, e.g. as a result of a collision, in the longitudinal direction than is required to displace the connecting piece 1 relative to the shaft 7 in said direction.

FIG. 4 shows a connecting assembly which substantially corresponds to that shown in FIG. 1, but with the shaft end 7, towards its end, having thickened portions 10 for influencing the course of the destroying forces which in this case is regressive.

FIG. 5 shows a connecting assembly comprising the same details as those shown in FIG. 1, but with the shaft end 7 having portions 11 of reduced thickness for influencing the course of the destroying force which in this case is progressive.

Figure 6:
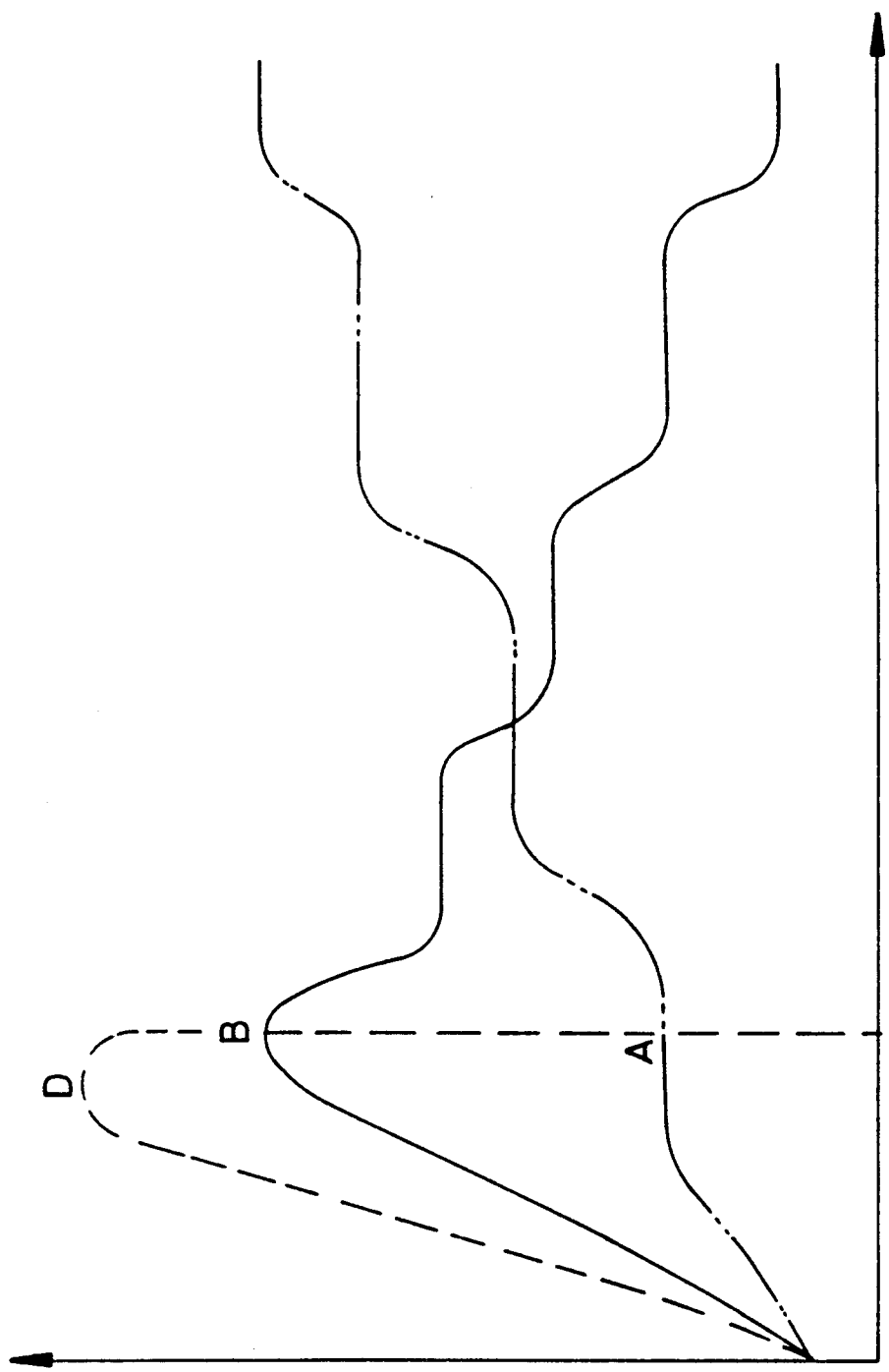
FIG. 6 shows force-time curves of differently designed connecting pieces.

FIG. 6 illustrates several force-time diagrams of different connecting assemblies designed in accordance with the principle of the invention and compared with a tube end in accordance with the state of the art. Curve "A" represents the course of destruction of the shaft end according to FIG. 4, curve "B" represents the course of destruction of the shaft end according to FIG. 5, whereas curve "D" represents the destruction of a shaft end in accordance with the state of the art, for example according to US 4 722 717.

We claim:

1. A connecting assembly suitable for use as part of a propeller shaft of the drive line of a motor vehicle, said assembly comprising a tubular shaft having an end and a thickness which varies along a length of said tubular shaft between said end and a position spaced from said end, an end portion of said tubular shaft extending from said end thereof, a connecting piece positioned coaxially and telescopically with respect to said end portion, interfitting circumferential connecting means between said end portion and said connecting piece whereby drive can be transmitted between said tubular shaft and said connecting piece and a predetermined longitudinal force tending to cause relative telescopic movement between said shaft and said connecting piece is resisted, and engaging means on said connecting piece for engaging said end portion when a longitudinal force greater than said predetermined force is applied to said connecting piece or to said tubular shaft and which moves said connecting piece into said tubular shaft so as to absorb said greater longitudinal force by destroying said end portion, said connecting piece being movable into said tubular shaft, the relative strengths of said end portion and said engaging means and the configuration of said engaging means being such that engagement of said end portion with said engaging means causes destruction of said end portion and said tubular shaft, said tubular shaft being designed to sustain without damage a longitudinal force greater than said predetermined force if said end portion is not engaged with said engaging means as a result of the connecting piece moving into the tubular shaft.

2. A connecting assembly according to claim 1 wherein the shaft is made of fiber composite material.

3. A connecting assembly according to claim 2, wherein the variable wall thickness is provided by additional circumferential windings.

4. A connecting assembly according to claim 3, wherein the wall thickness decreases in steps in a direction away from said end of said tubular shaft.

5. A connecting assembly according to claim 3, wherein the wall thickness increases in steps in a direction away from said end of said tubular shaft.

6. An assembly according to claim 1, wherein said connecting means comprises longitudinal teeth on said connecting piece, a cylindrical internal surface in said end portion and at least one connecting member secured to said internal surface and form-fitting engaging said longitudinal teeth.

7. A connecting assembly according to claim 6, wherein the connecting member is a sleeve adhesively-secured to said internal surface of said end portion of said tubular shaft.

8. A connecting assembly according to claim 6, wherein the connecting member is formed in situ between two collar regions on the connecting piece which engage said internal surface of said end portion of the tubular shaft.

9. A connecting assembly according to claim 6, wherein the connecting member has at least one opening so that in at least one circumferential region an adhesive connection can be provided directly between the connecting piece and the internal surface of the end portion of the tubular shaft.

10. A connecting assembly according to claim 6, wherein a separating layer is provided between the connecting member and the connecting piece.

11. An assembly according to claim 1, wherein said connecting means comprises a part of said connecting piece having a polygonal cross-section, a cylindrical internal surface in said end portion and at least one connecting member secured to said internal surface and form-fittingly engaging said polygonal cross-section of said part of the connecting piece.

12. An assembly according to claim 1, wherein said connecting mean comprises a tearing cone on said connecting piece adjacent to said end of the tubular shaft.

13. An assembly according to claim 1, wherein said connecting mean comprises at least one cutting wedge on said connecting piece adjacent to said end of the tubular shaft.

* * * * *